T & C. Plumleigh,
Converting Motion.
Nº 69,584. Patented Oct. 8, 1867.
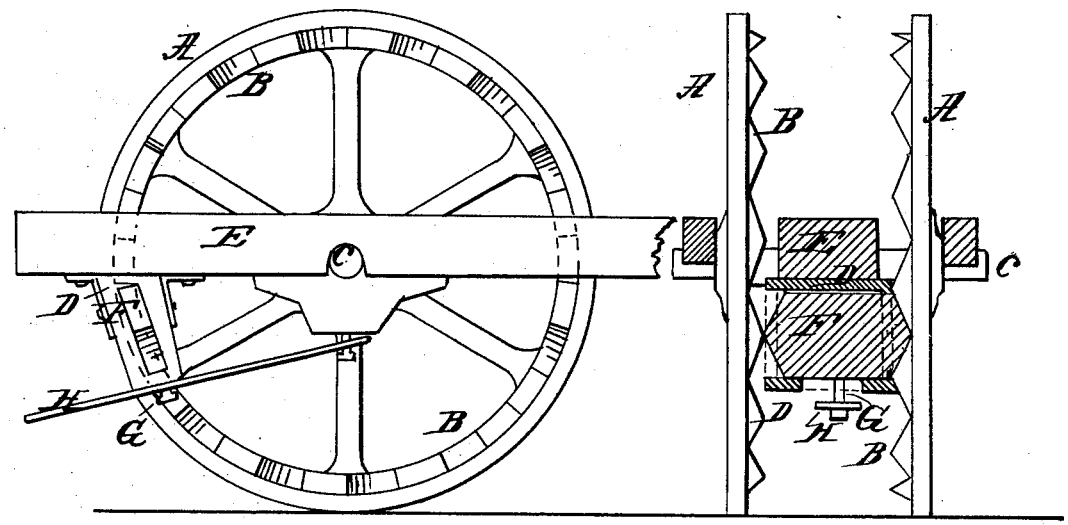
Witnesses
Jas. R. Hayden
J. B. Turching
Inventor
Thomas Plumleigh
Charles Plumleigh

United States Patent Office.

THOMAS PLUMLEIGH AND CHARLES PLUMLEIGH, OF DUNDEE, ILLINOIS.

Letters Patent No. 69,584, dated October 8, 1867.

---

IMPROVEMENT IN CONVERTING CIRCULAR INTO RECIPROCATING MOTION.

---

The Schedule referred to in these Letters Patent and making part of the same.

---

TO ALL WHOM IT MAY CONCERN:

Be it known that we, THOMAS PLUMLEIGH and CHARLES PLUMLEIGH, both of the town of Dundee, county of Kane, and State of Illinois, have invented new and useful "Device to Convert Rotary into Reciprocating Motion;" and we do hereby declare that the following is a full and exact description thereof, reference being had to the accompanying drawings, making part of this specification, in which—

Figure 1 represents the elevation of one wheel and the box for the slide, and

Figure 2 the back view of the two wheels and the slide, the box being represented in section.

The nature of our invention consists in converting circular into reciprocating motion by means of two wheels supplied with cogs or cams, of a triangular shape, and a slide set between said wheels, and moved by them in a reciprocating way, to which a working lever is attached, as will be hereinafter fully explained.

To enable others skilled in the art to make and use our invention, we will proceed to describe its construction and operation.

The sides of the tires of the driving-wheels A A, made of metal or wood, or any suitable material, are supplied with cogs or cams B B of a triangular shape, of any desirable number and size, said cogs being made of one piece with the tires of the wheels, or forming a separate wheel, or several segments, and riveted to the tires of the wheels. The wheels A A are firmly set on an axle or shaft, C, in such a manner that the projecting points of cogs of one wheel are directly opposite to the recesses of the cogs of the other wheel. A box, D, attached to the central piece of timber E of the carriage or frame, contains a slide, F, so constructed that the ends of said slide fit exactly the recesses between the cogs B B, while its length being equal to the distance between the projecting points of the cogs of one wheel and the receding point of the cogs of the other wheel. A bolt, G, passing through the slide F and playing in the slot cut in the bottom of the box D, keeps the slide in a proper position, and supports a lever, H, at the same time. To this lever H is attached another lever or bar, or box, or any other thing to which it is desirable to communicate a rapid reciprocating motion.

The operation consists in this, that when the wheels A A are moving the inclined planes of the cogs B B pressing on the inclined planes of the ends of the slide D move the last, and the lever H attached to it, to and fro continually. Instead of one, two slides may work the same lever, H. We have illustrated our device in such a shape as to have it used on a reaper or mower, for the purpose of communicating a reciprocating motion to the sickle-bar, but the device may be readily applied to other purposes, as, for instance, the shaking of sieves, the working of saws, &c.

What we claim as our invention, and desire to secure by Letters Patent, is—

The device to convert circular into reciprocating motion, consisting of two wheels A A, supplied with triangular cogs or cams B B, and secured to an axle or shaft, C, in such a manner that the cogs of one wheel are directly opposite to the recesses of the other wheel, and the slide D, shaped to fit the recesses of the cogs B B, and of the length equal to the space between the projecting points of the cogs of one wheel and the receding points of the cogs of the other wheel, said slide being supported by means of a bolt, G, playing in a slotted box, D, or some other equivalent means, the whole constructed and operating substantially as and in the manner herein described and specified, and for the purposes set forth.

THOMAS PLUMLEIGH,
CHARLES PLUMLEIGH.

Witnesses:
JAS. R. HAYDEN,
J. B. TURCHIN.